United States Patent [19]

Sternberg

[11] 4,306,777
[45] Dec. 22, 1981

[54] ELLIPTICIZED OPTICAL LENS PROVIDING BALANCED ASTIGMATISM

[75] Inventor: Robert L. Sternberg, Noank, Conn.

[73] Assignee: The United States of America as represented by the Secretary of the Navy, Washington, D.C.

[21] Appl. No.: 138,617

[22] Filed: Apr. 9, 1980

Related U.S. Application Data

[63] Continuation-in-part of Ser. No. 949,711, Oct. 10, 1978, Pat. No. 4,224,626.

[51] Int. Cl.³ .............................................. G02B 3/04
[52] U.S. Cl. .................................................... 350/432
[58] Field of Search ......................................... 350/432

[56] References Cited

U.S. PATENT DOCUMENTS

| | | | |
|---|---|---|---|
| 2,736,894 | 2/1956 | Kock | 343/911 R |
| 3,146,451 | 8/1964 | Sternberg | 343/753 |
| 3,958,559 | 5/1976 | Glenn et al. | 73/642 |

Primary Examiner—John K. Corbin
Assistant Examiner—Rebecca D. Gass
Attorney, Agent, or Firm—Robert F. Beers; Arthur A. McGill

[57] ABSTRACT

An ellipticized singlet azimuth versus elevation optimized and aperture extremized nonspherical optical lens of very low or even minimal F-number providing balanced astigmatism for wide angle optical applications is described. The optical lens has an elliptical periphery and surfaces defined by a system of nonlinear partial differential equations, the surfaces acting together to produce two perfect primary off-axis foci F and F' at a finite distance in back of the lens and two perfect conjugate off-axis foci $F_\infty$ and $F'_\infty$ in front of the lens at infinity; i.e., the optical lens simultaneously focuses energy from the primary foci F and F' into two off-axis parallel ray plane wave beams directed towards infinity at equal but opposite angles with respect to the optical lens axis. The optical lens may be built of various materials such as any of several barium flint glasses.

8 Claims, 5 Drawing Figures

$\phi_1 \cong 20.01°$
$\phi_1' \cong 25.87°$

ELLIPTIC APPROXIMATION
$\beta_{11}' = 0$

CORRECTED WITH $\beta_{11}' = 1.5 \times 10^{-5}$

ELLIPTICIZED OPTICAL-LENS PROVIDING BALANCED ASTIGMATISM

STATEMENT OF GOVERNMENT INTEREST

The invention described herein may be manufactured and used by or for the Government of the United States of America for governmental purposes without the payment of any royalties thereon or therefor.

This application is a continuation-in-part of application Ser. No. 949,711 filed Oct. 10, 1978 now patent No. 4,224,626 for Ellipticized Lens Providing Balanced Astigmatism.

BACKGROUND OF THE INVENTION

In the design of singlet optical lenses for certain applications in the optical spectrum at wide angles off-axis it is sometimes desired to achieve greater off-axis angles of operation in one plane than in the other, greater azimuth performance usually being sought in preference to better elevation performance. Due to requirements for weight minimization and compact packaging for aircraft and space craft vehicle installations where both system volume and weight are at a premium, it is further sometimes desirable to extremize the lens in the sense of maximizing the lens aperture or minimizing the lens volume and sometimes simultaneously to achive a minimum, or at any rate a near minimum, F-number.

On the other hand, using modern nonspherical lens fabrication and grinding techniques there is no need to restrict the lens design to spherical surfaces grindable only by self-correcting motions as in classical optical lens manufacture, but rather, nonspherical lenses of quite complex shape may be readily used. With this relaxation of the design requirements, consideration was first given to nonspherical but rotationally invariant lenses, i.e., nonspherical lenses whose surfaces are surfaces of revolution about the lens axis such as the aplanatic, and generalized aplanatic lenses of L. C. Martin, and R. L. Sternberg. Such lenses, however, like any ordinary singlet lens, spherical or nonspherical, invariably suffer when extremized from astigmatism at off-axis points with the magnitude of that aberration increasing with increasing angles off-axis and decreasing F-number.

SUMMARY OF THE INVENTION

In order to circumvent the astigmatic defect of all single element rotationally invariant extremized lenses at off-axis angles for the purpose of achieving increased off-axis capability in the azimuth plane at the anticipated sacrifice of a reduction in elevation performance, the possibility of designing a geometrically perfect nonspherical bifocal lens in three-space, symmetric with respect to two orthogonal planes through the lens axis, one of which contains its design foci, and complete with minimal lens volume and a very low, or in some instances an even minimal, F-number is considered. Such a nonspherical optical lens, has axial symmetry about the z-axis, and also plane symmetry about both the x,z and y,z-planes, but no surfaces of revolution and has balanced astigmatism; i.e., negative astigmatism on axis, zero astigmatism at its off-axis design points or primary foci F and F' and positive astigmatism at still further off-axis points and, consequently, offers the opportunity for an optimized trade off between azimuth and elevation performance capability by suitable optimum choice of the basic lens parameters.

DESCRIPTION OF THE PREFERRED EMBODIMENT

The geometrical shape of the ellipticized azimuth versus elevation optimized and aperture extremized nonspherical singlet optical lens comprising the present invention is characterized by the following boundary value problem and is an extension of the inventor's prior lens antenna invention as described in U.S. Pat. No. 3,146,451.

Figure 1:
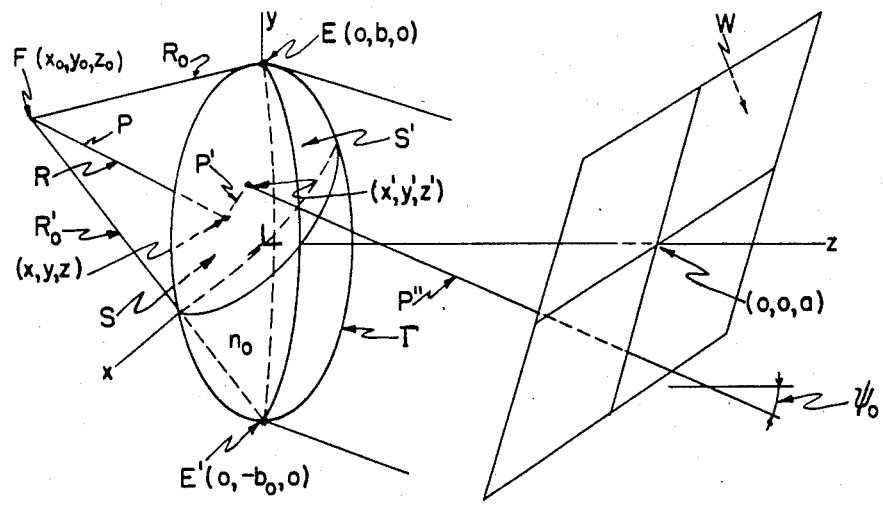
FIG. 1 illustrates an ellipticized optical lens with surfaces S and S' and their refractive effect on the rays R and $R_o$ from the focus F to the wavefront W.

Referring now to FIG. 1 there is shown an optical lens with a graphical representation of a general ray structure. A dual ray structure is also described but is not shown in FIG. 1 as it would excessively complicate the drawing and can be readily understood from the description. The optical lens can be made of various glasses such as several of the barium flint glasses.

Given the focal distance $|z_o|$, the lens diameter $2b_o$, the index of refraction of the lens material $n_o > 1$, the off-axis design angle $\psi_o$ and the wavelength $\lambda_o$ of the incident light wave to be focused by the lens, i.e., given the parameters $$|z_o|, 2b_o, n_o > 1, \psi_o, \lambda_o, \qquad (1)$$

let the lens surfaces S and S' in FIG. 1 have equations of the form $$S: z=z(x,y), \quad S': z'=z'(x',y'), \qquad (2)$$

and let a general ray R from the off-axis design focal point $F(x_o, y_o, z_o)$ pass through the lens surface S at the point x, y, z and through the surface S' at the point x', y', z'. At each of the interfaces the ray is refracted in accordance with Snell's Law. The ray emerges from the optical lens in the direction $\psi_o$, that is to say parallel to the y,z-plane and at the angle $\psi_o$ with respect to the z-axis. Let W denote the corresponding orthogonal light wave front. In order to achieve a dual ray structure from a symmetrically placed dual focal point at F' $(x_o, -y_o, z_o)$ so that a general ray R' from the latter point emerges from the optical lens in the corresponding dual direction $-\psi_o$, we require the lens surfaces S and S' to be symmetrical about the x,z-plane and, taking $x_o=0$, we require further and without loss of generality, that the surfaces S and S' also be symmetric about the y,z-plane. Finally, extremizing the optical lens design so as to obtain a maximal lens aperture, or what is the same thing, a minimal lens volume, by requiring that the lens surfaces S and S' intersect in a sharp boundary curve, or lens periphery, $\Gamma$, our problem then is to so determine the shape of the lens and the form of the functions z=z(x,y) and z'=z'(x',y') specifying the lens surfaces S and S' in (2) as to insure that all rays R from the focal point $F(x_o, y_o, z_o)$ incident on the lens within the lens periphery Γ are perfectly collimated by the lens into a parallel ray plane wave light beam perfectly focused at infinity in the direction $\psi_o$ and, by symmetry, that all rays from the dual focal point $F'(x_o, -y_o, z_o)$ similarly incident on the optical lens within the periphery Γ are similarly perfectly focused by the lens at infinity in the dual direction $-\psi_o$.

Taking appropriate vector cross products between the incident ray R and the normals to the optical lens surfaces S and S' at the points x,y,z, and x',y',z', respectively, in the illustration, and applying Snell's Law at each interface, and using the Jacobian notation for appropriate two by two determinants of partial derivatives, we readily obtain for the lens surfaces S and S' the system of partial differential equations $$S: \frac{\partial z}{\partial x} = F(A) \qquad \frac{\partial z}{\partial y} = G(A) \qquad (3)$$

$$S': \frac{\partial(z',y')}{\partial(x,y)} = F'(A) \frac{\partial(x',y')}{\partial(x,y)},$$

$$\frac{\partial(x',z')}{\partial(x,y)} = G'(A) \frac{\partial(x',y')}{\partial(x,y)},$$

where A denotes the arguments A=(x,y,z,x',y',z') and the coefficient functions F(A) to G'(A) are of the forms $$F(A) = \frac{n_o(x'-x)p - xp'}{(z-z_o)p' - n_o(z'-z)p}, \qquad (4)$$

$$G(A) = \frac{n_o(y'-y)p - (y-y_o)p'}{(z-z_o)p' - n_o(z'-z)p},$$

$$F'(A) = \frac{n_o(x'-x)}{p'\cos\psi_o - n_o(z'-z)},$$

$$G'(A) = \frac{n_o(y'-y) + p'\sin\psi_o}{p'\cos\psi_o - n_o(z'-z)},$$

and where p and p' denote the path length elements defined by the expressions $$\begin{aligned}p^2 &= x^2 + (y-y_o)^2 + (z-z_o)^2, \\ p'^2 &= (x'-x)^2 + (y'-y)^2 + (z'-z)^2,\end{aligned} \qquad (5)$$

and are thus the geometrical lengths of the segments of the ray R indicated in the figures.

In writing the partial differential equations (3) for the optical lens surfaces S and S' we have taken as independent variables the variables x and y which are the x,y coordinates of the point of intersection of the ray R with the lens surface S and we have considered the unknown coordinate z of this point and the unknown coordinates x',y',z' at which the ray R intersects the lens surface S', each to be functions of these variables.

That is to say we suppose the equations (2) for S and S' can also be written in the form $$S: z=z(x,y), \quad S': z'=z'^*(x,y), \qquad (6)$$

the latter of these being a parameterization of the equation for surface S' in terms of the variables x and y.

Essentially equivalent to either pair of the partial differential equations in (3) and capable of being substituted for one of those pairs of equations by Malus's Theorem or, as may be shown by direct substitution, is the optical path length condition that $$\begin{aligned}P &\equiv p + n_o p' + p'' \\ &= [x^2 + (y-y_o)^2 + (z-z_o)^2]^{\frac{1}{2}} + \\ &\quad n_o[(x'-x)^2 + (y'-y)^2 + (z'-z)^2]^{\frac{1}{2}} + \\ &\quad (a-z')\cos\psi_o + y'\sin\psi_o \\ &= P_o = \text{constant},\end{aligned} \qquad (7)$$

for all rays R from the focal point $F(x_o, y_o, z_o)$ to the light wave front W propagating in the direction $\psi_o$ with instantaneous intercept a on the z-axis as illustrated and, applying this relation to the extremal rays $R_o$ and $R'_o$ which pass through the lens extremities $E(0, b_o, 0)$ and $E'(0, -b_o, 0)$, we find for the focal point $F(x_o, y_o, z_o)$ the coordinates $$F: x_o=0, \; y_o=[b_o^2+z_o^2\sec^2\psi_o]^{\frac{1}{2}}\sin\psi_o, \; z_o=-|z_o|, \qquad (8)$$

and for the constant $P_o$ in (7) the expression $$P_o=[b_o^2+z_o^2\sec^2\psi_o]^{\frac{1}{2}}+a\cos\psi_o, \qquad (9)$$

similarly as in U.S. Pat. No. 3,146,451. In terms of (8) the dual focal point is now $F'(x_o, -y_o, z_o)$.

The natural symmetry of the optical lens surfaces S and S' about the x,z-plane imposed by the requirements of providing for a dual ray structure from the dual focus $F'(x_o, -y_o, z_o)$ and the symmetry about the y,z-plane corresponding to the assumption that $x_o=0$ results in the four symmetry conditions $$S: \begin{array}{l} z(-x,y) = z(x,y), \\ z(x,-y) = z(x,y), \end{array} \quad S': \begin{array}{l} z'(-x',y') = z'(x',y'), \\ z'(x',-y') = z'(x',y'), \end{array} \qquad (10)$$

as additional requirements on the functions defining the lens surfaces S and S' in (2) in terms of the variables x,y and x',y' which in terms of the variables x and y as independent variables become of course much more complicated relations. The symmetry conditions will subsequently be seen to play a very strong role in the mathematics of the problem.

Applying the extremizing condition that the lens has a maximal aperture or, equivalently, has a minimal volume in the sense described previously so that the lens surfaces S and S' intersect in a sharp periphery Γ passing through the lens extremities $E(0,b_o,0)$ and $E'(0,-b_o,0)$ as in the figures, we readily derive as the boundary conditions of the problem the requirement that that the functions z(x,y) and z'(x',y') in (2) satisfy the relations $$z(x,y)=z'(x,y)=0, \qquad (11)$$

on the ellipse $$\Gamma: (x^2/b_o^2 \cos^2\psi_o)+(y^2/b_o^2)=1 \qquad (12)$$

To derive (11) and (12) we use relations (7) to (10) all together and equate z(x,y) to z'(x,y).

Finally, similarly as in U.S. Pat. No. 3,146,151 we have as the conditions for F-number minimization that the exiting segment of the ray $R_o$ from the focal point $F(x_o, y_o, z_o)$ be tangent to the optical lens surface S' at the lens extremity $E(0, b_o, 0)$ and similarly for the corresponding ray from the dual focal point $F'(x_o, -y_o, z_o)$. Note that the optical lens in the illustration has an almost, but not quite, minimal F-number where $F=|-z_o|/2b_o$.

Our present invention is now characterized as a solution for the lens surfaces S and S' in the boundary value problem consisting of the system of partial differential equations (3) and (4) solved subject to the conditions (7) to (12) with or without the optional additional condition of F-number minimization appended.

A variety of analytic, approximate, and numerical approaches and solution algorithms are viable for application to the solution of the optical lens boundary value problems with nearly minimal F-numbers and, to the problem with the F-number minimized. Such solutions were given by the inventor in U.S. Pat. No. 3,146,451 for the corresponding two-dimensional lens problem. These solutions pertained to microwave lenses but are equally applicable to optical lenses. Here we extended these solutions to the present partial differential equations problem in three dimensions.

To the foregoing end, ellipticizing the two-dimensional successive approximation solution of the lens problem presented in U.S. Pat. No. 3,146,451 and appending appropriate Taylor series terms, we solve the boundary value problem (1) to (12) in the mixed forms $$S: z = \lim_{N \to \infty} \sum_{n=0}^{2N+1} \beta_n(N)[(x^2/\cos^2\psi_o) + y^2]^n + \qquad (13)$$

$$\sum_{m,n=1}^{\infty} \beta_{mn} x^{2m}[(x^2/\cos^2\psi_o) + y^2 - b_o^2]^n,$$

$$S': z' = \lim_{N \to \infty} \sum_{n=0}^{2N+1} \beta_n'(N)[(x'^2/\cos^2\psi_o) + y'^2]^n + \qquad (14)$$

$$\sum_{m,n=1}^{\infty} \beta'_{mn} x'^{2m}[(x'^2/\cos^2\psi_o) + y'^2 - b_o^2]^n,$$

assuming the F-number is nonminimal. Here the $\beta_n(N)$ and $\beta'_n(N)$ are the successive approximation coefficients obtained in U.S. Pat. No. 3,146,451 for the two-dimensional problem and $\beta_{mn}$ and $\beta'_{mn}$ are correction, or completion, terms corresponding to the slight but finite deviations of the lens surfaces S and S' in the three-dimensional problem from a simple elliptic transformation of the corresponding optical lens surfaces S and S' in the essentially two-dimensional problem discussed in U.S. Pat. No. 3,146,451.

Figure 2:
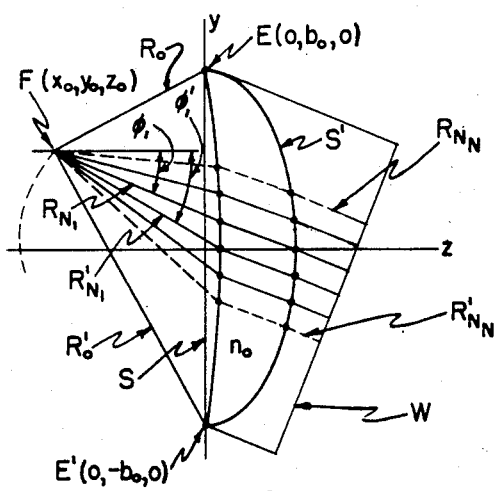
FIG. 2 illustrates the meridional plane cross-section of the ellipticized optical lens of FIG. 1 and the rays $R_{N1}$ to $R_{NN}$ and $R'_{N1}$ to $R'_{NN}$ used in calculation of the eigenvalue like angles $\phi_1$ and $\phi'_1$.

To obtain the coefficients $\beta_n(N)$ and $\beta'_n(N)$ in the polynominal approximations in (13) and (14) with the F-numbers nonminimal we begin exactly as in the two-dimensional problem of U.S. Pat. No. 3,146,451 by fitting 2 N+2 rays $R_o, R'_o, R_{N1}, R'_{N1}, \ldots, R_{NN}$ and $R'_{NN}$ from the focal point $F(x_o, y_o, z_o)$ in the y,z-plane cross section of the optical lens as in FIG. 2 such that these rays are perfectly controlled in both direction and path length by the polynominal approximates to the lens surfaces S and S' of degree 4 N+2. As in U.S. Pat. No. 3,146,451 the technique hinges on solutions for approximate values of the eigenvalue like angles $\phi_1$ and $\phi'_1$ in the illustration associated with the rays $R_{N1}$ and $R'_{N1}$ which pass through the optical lens vertices, or axial intercepts of the optical lens surfaces S and S', as shown. This solution in turn depends on solution of simultaneous determinantal equations of the form $$\Delta(\phi_1,\phi_1') \equiv \begin{vmatrix} b_o^2 & b_o^4 & \ldots & b_o^{2n} & B_o \\ 2b_o & 4b_o^3 & \ldots & 2nb_o^{2n-1} & \tan\xi_o \\ Y_j^2 & Y_j^4 & \ldots & Y_j^{2n} & B_o - Z_j \\ 2Y_j & 4Y_j^3 & \ldots & 2nY_j^{2n-1} & \tan\Xi_j \end{vmatrix} = 0, \qquad (15)$$

$(j = 1,2,\ldots,N; n = 2N + 1),$ and $$\Delta'(\phi_1,\phi_1') \equiv \begin{vmatrix} b_o^2 & b_o^4 & \ldots & b_o^{2n} & B_o' \\ 2b_o & 4b_o^3 & \ldots & 2nb_o^{2n-1} & \tan\xi_o' \\ Y_j^2 & Y_j^4 & \ldots & Y_j^{2n} & B_o' - Z_j \\ 2Y_j & 4Y_j^3 & \ldots & 2nY_j^{2n-1} & \tan\Xi_j \end{vmatrix} = 0, \qquad (16)$$

$(j = 1,2,\ldots,N; n = 2N + 1),$ for the quantities $\phi_1$ and $\phi'_1$. In (15) and (16) the elements of the determinants $\Delta(\phi_1,\phi'_1)$ and $\Delta'(\phi_1,\phi'_1)$ and, hence, the determinants themselves, depend only on $\phi_1$ and $\phi'_1$; i.e., each element of each determinant is either a constant or a function of $\phi_1$ or $\phi'_1$ or both. Moreover, the functions defining the elements are simple elementary algebraic and trigonometric expressions as in U.S. Pat. No. 3,146,451 so no great difficulties attend the solution of the system (15) and (16) for $\phi_1$ and $\phi'_1$ for given N.

Letting the polynominal approximations in the solutions for the lens surfaces S and S' in (13) and (14) converge to analytic limits and noting that the infinite series (13) and (14) are suitably convergent it then follows that the coefficients $\beta_{mn}$ and $\beta'_{mn}$ in the latter parts of (13) and (14) can be obtained by a Cauchy-Kovalevsky type process, i.e., by the method of limits using known expressions for the derivatives $(d^k/dy^k)z(0,y)$ and $(d^k/dy'^k)z'(0,y')$ developed for the two-dimensional problem in U.S. Pat. No. 3,146,451 together with the chain rule, to compute the quantities $$\frac{\partial^{i+j}}{\partial x^i \partial y^j} \lim_{N \to \infty} \sum_{n=0}^{2N+1} \beta_n(N)[(x^2/\cos^2\psi_o) + y^2]^n, \qquad (17)$$

$(i,j = 0,1,2,\ldots \infty),$ $$\frac{\partial^{i+j}}{\partial x'^i \partial y'^j} \lim_{N \to \infty} \sum_{n=0}^{2N+1} \beta_n'(N)[x'^2/\cos^2\psi_o) + y'^2]^n, \qquad (18)$$

$(i,j = 0,1,2,\ldots \infty),$ required in the process. For practical purposes one can sometimes even determine a few of the coefficients by trial and error using ray tracing methods to check the results. We use the latter method to obtain an approximate value of a single coefficient $\beta'_{11}$ in the example worked out below.

Figure 3:
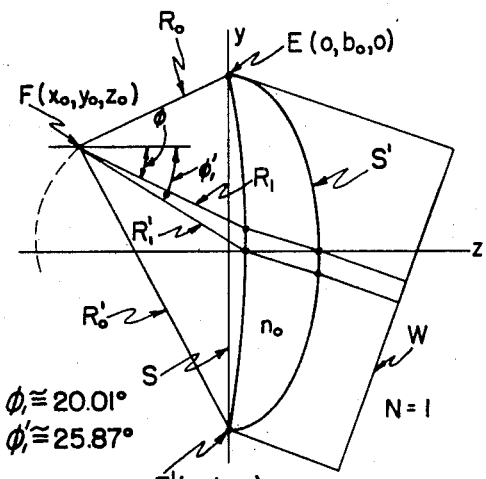
FIG. 3 illustrates meridional plane cross-section of the ellipticized optical lens of FIG. 1 showing the particular case of FIG. 2. where N=1.
Figure 4A:
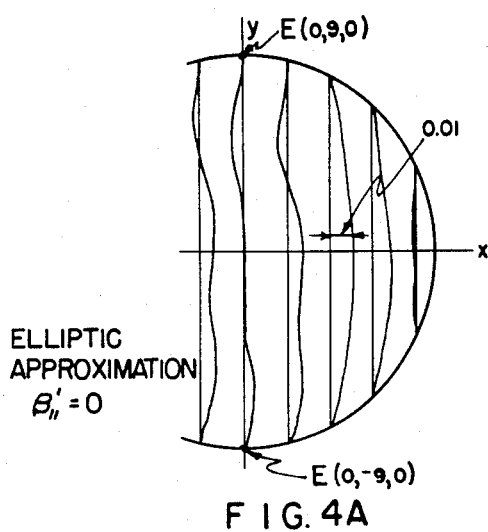
FIGS. 4A and 4B illustrate the ray tracing results of successively more accurate determinations of the ellipticized optical lens of FIG. 1.
Figure 4B:
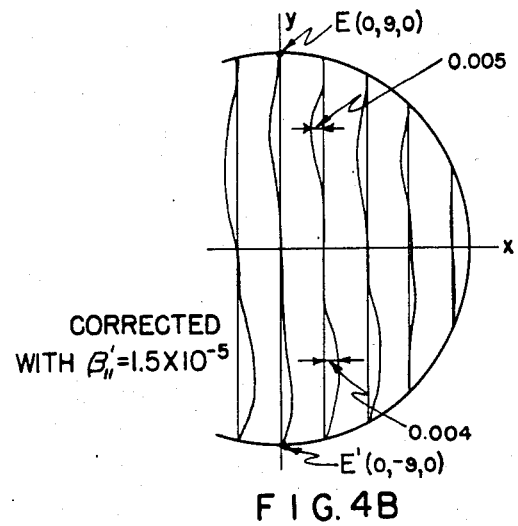

Computational experience with the mixed forms of solution (13) and (14) indicates that the convergence of both the limit expressions and the infinite series in (13) and (14) is exceedingly rapid even when the F-numbers are nearly minimal. Thus, for example, for the case of a barium flint optical lens with F-number one-half at 20 degrees off-axis having as basic parameter values the numbers $$|z_o| = 9, \; 2b_o = 18, \; n_o = 1.594, \; \psi_o = 20; \qquad (19)$$

and $\lambda_o$ arbitrary, and taking the simplest case $N=1$ in (13) and (14), as in FIG. 3 we obtain for the coefficients $\beta_n(N)$ and $\beta'_n(N)$ the values $$\begin{array}{ll} S: & S': \\ \beta_0(1) = 2.68 \times 10^{-1}, & \beta_0'(1) = 5.369 \times 10^0, \\ \beta_1(1) = 9.20 \times 10^{-5}, & \beta_1'(1) = -5.569 \times 10^{-2}, \\ \beta_2(1) = -6.65 \times 10^{-5}, & \beta_2'(1) = -7.266 \times 10^{-5}, \\ \beta_3(1) = 3.02 \times 10^{-7}, & \beta_3'(1) = -7.166 \times 10^{-7}, \end{array} \qquad (20)$$

which, with all $\beta_{mn}$ and $\beta'_{mn}$ values zero, yields the ray tracing results shown in FIG. 4A and, which, with all of the latter coefficients zero except for $\beta'_{11}$ which we find by trial and error has approximately the value $\beta'_{11} = -1.5 \times 10^{-5}$, yields the ray tracing data shown in FIG. 4B. In the first case the wave front is seen to be flat to within 0.01 units over a circular region of diameter 18 cos $\psi_o$ units, or to be flat to within one part in 1690, and in the second case it is seen to be flat to within 0.005 units over the same circular region, or to be flat to within one part in 3380.

By the quarter wavelength Rayleigh criterion for diffraction limited beam forming, the latter case of the foregoing example lens with F=½ at 20 degrees is capable of forming a collimated beam of half-power width of approximately one-fifteenth of a degree, or four minutes of arc, or twice this with a one-eighth wavelength Rayleigh criterion, a well focused beam in either case for a bifocal lens with so very low an F-number. Further calculating would permit the design of bifocal ellipticized lenses with the same low F-number capable of forming beams of any required degree of sharpness of focus or narrowness of beam.

Finally, if the F-number is actually to be a minimum, the foregoing treatment needs modification along the lines of the related well known treatment of the generalized aplanatic lens design problem as will be easily recognized by those skilled in the art. In particular if such is to be the case, it will normally be best to give up the analytic expressions for the lens surface S' in (13) and (14) and determine S' from S by satisfaction of the path length condition after previously determining S as before.

After solving the optical lens boundary value problem we then seek to adjust the basic lens parameters $|z_o|$, $n_o$, $\psi_o$ in (1) particularly the index of refraction $n_o$ and the off-axis design angle $\psi_o$, so as to balance astigmatism and optimize the optical lens for best balance of azimuth versus elevation off-axis performance. Generally we seek a maximum azimuth off-axis capability for given acceptable elevation performance. In carrying out this azimuth versus elevation off-axis performance trade off, any of several varied but more or less equivalent optimization criteria may be applied.

It has therefore been shown that an ellipticized azimuth versus elevation optimized and aperture extremized nonspherical lens having perfect primary off-axis focal points F and F' and perfect conjugate off-axis focal points $F_\infty$ and $F'_\infty$ at infinity is attainable. It has further been shown that such a lens balances the astigmatism in the sense of having negative astigmatism on axis, zero astigmatism at its off-axis or primary design foci F and F' and positive astigmatism at still further off-axis points and can be optimized for best trade off between azimuth and elevation off-axis capability by suitable optimal choice of the basic lens parameters.

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. An ellipticized singlet azimuth versus elevation optimized and aperture extremized nonspherical optical lens with surfaces S and S' specified by the partial differential equations $$S: \frac{\partial z}{\partial x} = F(A) \qquad \frac{\partial z}{\partial y} = G(A),$$

$$S': \frac{\partial(z',y')}{\partial(x,y)} = F(A) \frac{\partial(x',y')}{\partial(x,y)}, \quad \frac{\partial(x',z')}{\partial(x,y)} = G'(A) \frac{\partial(x',y')}{\partial(x,y)},$$

the symmetry conditions $$z(-x,y) = z(x,y), \qquad z'(-x',y') = z'(x',y'),$$
$$z(x,-y) = z(x,y), \qquad z'(x',-y') = z'(x',y'),$$

and the boundary conditions $$z(x,y) = z'(x,y) = 0,$$

on the ellipse $$\Gamma: (x^2/b_o^2 \cos^2\psi_o) + (y^2/b_o^2) = 1$$

where S and S' are the lens surfaces having functional representations of the forms $z=z(x,y)$ and $z'=z'(x',y')$ wherein $x'$ and $y'$ are themselves functions $x'=x'(x,y)$ and $y'=y'(x,y)$ of the independent variables x and y, $\partial z/\partial x$ and $\partial z/\partial y$ are the partial derivatives of z with respect to the independent variables x and y respectively, $\partial(z',y')/\partial(x,y)$, $\partial(x',y')/\partial(x,y)$ and $\partial(x',z')/\partial(x,y)$ are the Jacobian of $z'$ and $y'$ with respect to the independent variables x and y, the Jacobian of $x'$ and $y'$ with respect to the independent variables x and y and the Jacobian of $x'$ and $z'$ with respect to the independent variables x and y respectively, F(A), G(A), F'(A) and G'(A) are the functions of the arguments $A=(x,y,z,x',y',z')$ defined as $$F(A) = \frac{n_o(x' - x)p - xp'}{(z - z_o)p' - n_o(z' - z)p}$$

$$G(A) = \frac{n_o(y' - y)p - (y - y_o)p'}{(z - z_o)p' - n_o(z' - z)p},$$

$$F'(A) = \frac{n_o(x' - x)}{p'\cos\psi_o - n_o(z' - z)}$$

$$G'(A) = \frac{n_o(y' - y) + p'\sin\psi_o}{p'\cos\psi_o - n_o(z' - z)},$$

and where p and p' denote the path length elements defined by the expressions $$p^2 = x^2 + (y-y_o)^2 + (z-z_o)^2,$$
$$p'^2 = (x'-x)^2 + (y'-y)^2 + (z'-z)^2,$$

and $n_o$, $y_o$, $z_o$ and $\psi_o$ are respectively, the index of refraction of the lens material, the y and z coordinates of the finite focal point F and the off-axis angle to the infinite focal point $F_\infty$, $\Gamma$ is the ellipse bounding the lens formed by S and S' and is defined by the equation shown in which x and y are the independent variables and $b_o$ is the maximum radius of the lens formed by S and S' and the semi-major axis of the ellipse $\Gamma$.

2. An ellipticized optical lens according to claim 1 wherein said optical lens has two perfect off-axis focal points F and F' at a finite distance, and two perfect off-axis focal points $F_{2\delta}$ and $F'_\infty$ at an infinite distance, said focal points being in the directions $\pm\psi_o$ with respect to the optical lens axis.

3. An ellipticized optical lens according to claim 1 wherein said optical lens has two perfect off-axis finite focal points F and F' forming perfectly collimated plane wave beams directed toward infinity in the two off-axis directions $\pm\psi_o$.

4. An ellipticized optical lens according to claim 1 wherein said optical lens has balanced astigmatism having negative astigmatism on axis, zero astigmatism at the two primary focal points F and F' and positive astigmatism at far off-axis focal points.

5. An ellipticized optical lens according to claim 1 wherein said optical lens has wide angle off-axis performance capability providing increased off-axis capability in one plane at a sacrifice in capability in an orthogonal plane.

6. An ellipticized optical lens according to claim 1 wherein said optical lens has maximal aperture and minimal volume.

7. An ellipticized optical lens according to claim 1 wherein said optical lens is of substantially minimal F-number.

8. An ellipticized optical lens according to claim 1 wherein said optical lens is made out of barium flint glass.

* * * * *